Figure 2:
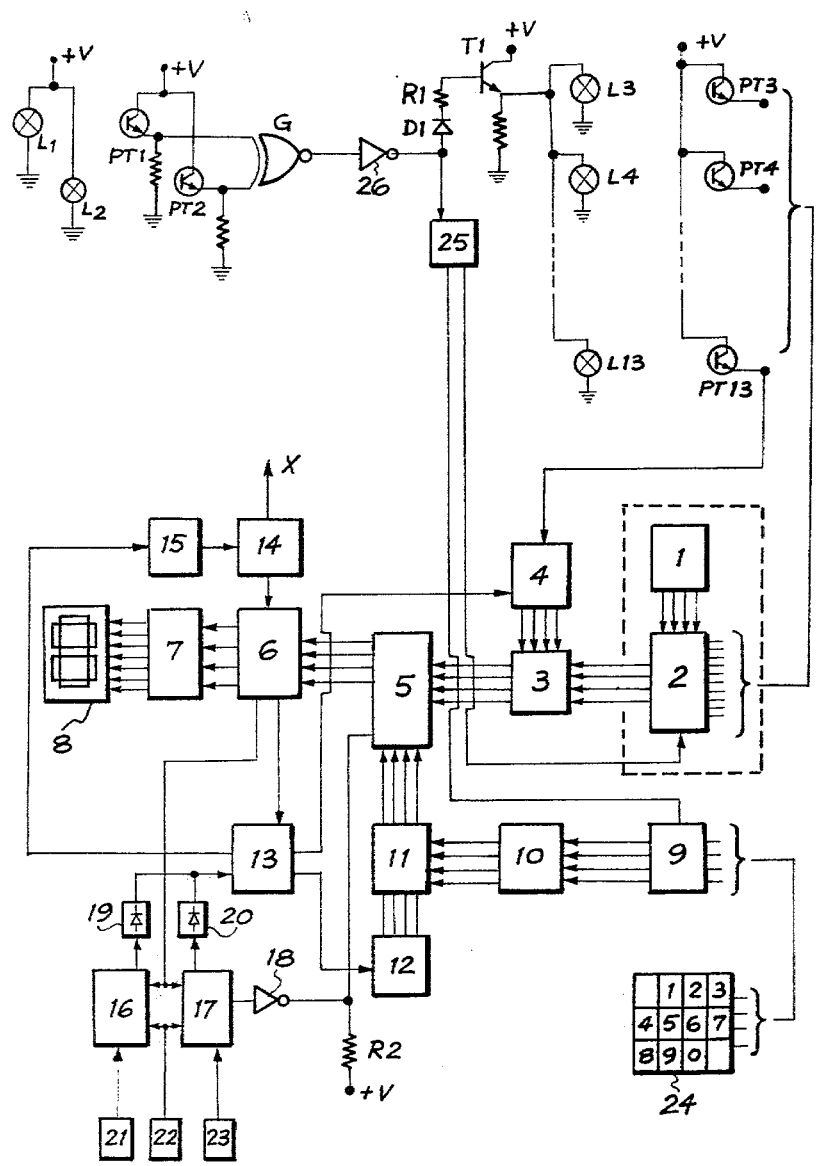

United States Patent [19]

Stanley et al.

[11] 4,266,102
[45] May 5, 1981

[54] AUTOMATIC DIALING DEVICE

[75] Inventors: Louis Stanley, Beverly Hills; Robert E. Sinclair, Summer Hill, both of Australia

[73] Assignee: Card-O-Matic Pty. Limited, Sydney, Australia

[21] Appl. No.: 92,408

[22] Filed: Nov. 8, 1979

Related U.S. Application Data

[63] Continuation of Ser. No. 899,190, Apr. 24, 1978, abandoned.

[30] Foreign Application Priority Data

Apr. 22, 1977 [AU] Australia .............................. PC9846
Dec. 2, 1977 [AU] Australia .............................. PD 2641

[51] Int. Cl.³ ............................................ H04M 1/278
[52] U.S. Cl. ............................ 179/90 CS; 179/90 BD; 179/19 BE
[58] Field of Search ............ 179/90 CS, 90 B, 90 BD, 179/18 BE, 5 R

[56] References Cited

U.S. PATENT DOCUMENTS

| | | | |
|---|---|---|---|
| 3,592,972 | 7/1971 | Lane | 179/90 CS |
| 3,727,010 | 4/1973 | Fuyama et al. | 179/90 CS |
| 3,784,793 | 1/1974 | Ito et al. | 179/90 CS |
| 3,809,826 | 5/1974 | Rhodes | 179/90 CS |
| 3,870,830 | 3/1975 | Tapiei | 179/90 CS |
| 3,920,926 | 11/1975 | Lenaentj et al. | 179/90 B |

*Primary Examiner*—Gerald L. Brigance
*Attorney, Agent, or Firm*—Ladas & Parry

[57] ABSTRACT

The present invention discloses an automatic telephone dialling device which is able to read a telephone number encoded on a business card, credit card, or similar flat object, store the number in a memory, and generate telephone dialling pulses in accordance with the stored memory.

In the preferred embodiment, a second memory and a keyboard are provided so that a telephone number may be entered into the second memory via the keyboard, either the card entered telephone number or the keyboard entered telephone number being able to be repeatedly dialled on demand.

In addition, a telephone call re-directing apparatus including the automatic telephone dialling apparatus, is disclosed in which an incoming call to an unattended telephone may be redirected via a second telephone to a predetermined telephone number.

7 Claims, 6 Drawing Figures

U.S. Patent May 5, 1981 Sheet 1 of 2 4,266,102
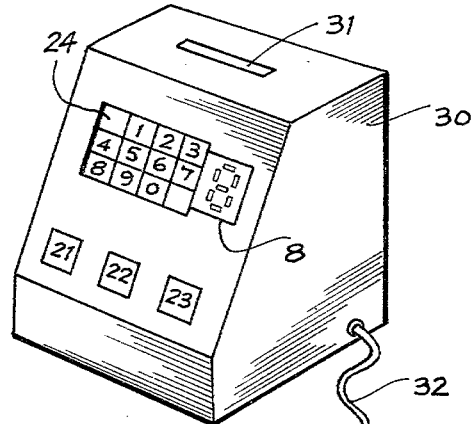
FIG.1
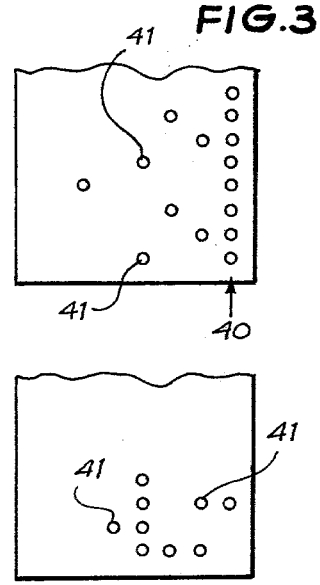
FIG.3
FIG.4
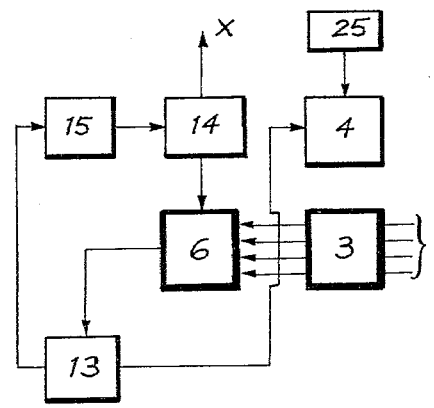
FIG.5
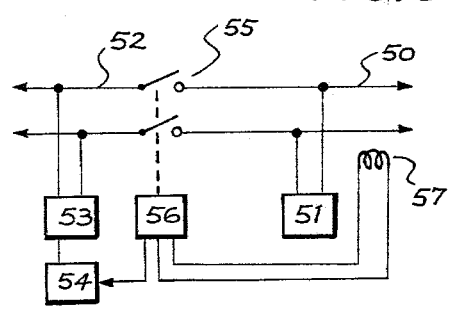
FIG.6

AUTOMATIC DIALING DEVICE

This is a continuation of co-pending application Ser. No. 899,190 filed Apr. 24, 1978 and now abandoned.

The present invention relates to an automatic telephone dialling device and, in particular, to an automatic telephone dialling device which permits a telephone number encoded on a business card, credit card, or the like to be dialled without the need for the caller to read the numbers on the card and then manually dial the telephone.

In many instances where a business card is given by one person to another, the recipient often keeps the business card for the purpose of recording the name and telephone number, in particular, of the person giving the card. In the event that the receiver of the card wishes to contact the other person, it is necessary that the card be located, the telephone number read and then manually dialled so as to produce the necessary telephone conversation.

Since the business card is generally kept, if future contact is required, it is the object of the present invention to provide an automatic telephone dialling device which enables an encoded business card to be used so that the issuer of the card may be reached by telephone without the need for the user of the automatic dialling device to manually dial the telephone number. With the introduction of Subscriber Trunk Dialling and International Subscriber Dialling, the length of telephone numbers required to be dialled by persons using a telephone, has increased and thus this facility is more desirable.

In the preferred embodiment of the present invention, the desired number is stored within the dialling unit and if the automatically dialled number is engaged, or does not otherwise answer, the call may be re-dialled at the press of a button. In addition, a keyboard facility is also preferably provided together with an associated memory, so that two telephone numbers, one entered into the device via an encoded card, and the other entered into the device via the keyboard, may be stored within the unit. Under this arrangement either number may be dialled as often as necessary in order to obtain the necessary telephone connection. In addition, apparatus for re-directing a telephone call is also disclosed.

According to one aspect of the present invention there is disclosed an automatic telephone dialling apparatus comprising card reading means to read an encoded telephone number from a business card, credit card, or similar flat object, a card entered memory connected to said card reading means to receive therefrom, and store, each digit of said encoded telephone number, and a dial pulse generating circuit connected to said memory to generate a telephone dialling pulse train in accordance with the numerical value of each of the digits stored in said memory.

Some embodiments of the present invention will now be described with reference to the drawings in which:

FIG. 1 is a perspective view of an automatic telephone dialling device in accordance with the preferred embodiment, FIG. 2 is a schematic block diagram of the circuit of the device of FIG. 1, FIG. 3 is a decimally encoded card suitable for use with the device of FIG. 1, FIG. 4 is a card similar to that illustrated in FIG. 3 but encoded in binary coded decimal, FIG. 5 is a schematic block circuit diagram of a simplified automatic telephone dialling device without keyboard which operates from a binary coded decimal card as illustrated in FIG. 4, and FIG. 6 is a schematic circuit arrangement illustrating a telephone call redirection circuit including the dialling device of FIGS. 1 and 2.

Referring now to FIG. 1, the automatic telephone dialling device of the preferred embodiment comprises a housing 30 having a slot 31 in the upper surface of the housing. On the front face of the housing are contained a keyboard 24, a seven segment numerical display 8, a card switch 21, a cancel switch 22 and a keyboard switch 23. The automatic dialling device is connected to a telephone (not shown) by means of a cable 32.

FIG. 3 shows a portion of a business card, credit card, or similar flat object which is encoded with a telephone number. In the decimal coding used in FIG. 3 a vertical column of registration holes 40 is provided. Each registration hole 40 marks the righthand extremity of a row which contains one other digit hole 41. Each digit hole may be in one of 9 positions along the row so as to indicate the value of the digit between 1 and 9. The absence of any digit hole 41 within a row indicates that the number represented by the row is zero.

Arranged within the slot 31 are 13 light sources L1 to L13 inclusive which are preferably light emitting diodes (LED's) and 13 corresponding phototransistors PT1 to PT13. The light sources and phototransistors are respectively arranged on opposite sides of the slot 31 such that each phototransistor is able to be illuminated by the correspondingly numbered light source. The light source L1 and the corresponding phototransistor PT1 are arranged adjacent the bottom of the slot 31.

However, the light sources L2 to L13 and phototransistors PT2 to PT13 are arranged from left to right, in that order, in a horizontal plane spaced closely below the upper surface of the housing 30. Light source L13 and phototransistor PT13 are arranged to permit light to pass through the registration holes 40 as the card of FIG. 3 enters the slot 31. Light source L2 and phototransistor PT2 are arranged sufficiently far to the left so as to ensure that light from light source L2 will not reach phototransistor PT2 whenever a card is inserted in the slot 31. The remaining light sources L3 to L12 and phototransistors PT3 to PT12 are evenly spaced so as to correspond to the possible locations of digit holes 41 contained in the card.

All the phototransistors PT1 to PT13 are supplied with power from a positive supply voltage V as are the light sources L1 and L2 which therefore emit light continuously. However, the light sources L3 to L13 inclusive will only emit light when the transistor T1 is not placed in a conductive state.

In the circuit of FIG. 2 the individual blocks indicated basically comprise individual integrated circuits which are known per se. Priority encoder 1 is a National 74147 priority encoder. Demultiplexer 2 is a National 74LS258 two line to one line inverting demultiplexer. Memories 3 and 11 are each a National DM74L5189N four line by 16 digit read/write memory. Binary counters 4 and 12 are each a National MM74C93 zero to 15 binary counter. Multiplexer 5 is a National 74LS257 two line to one line non-inverting multiplexer. Up/down counter 6 is a Cmos CD4029BCN presetable up/down counter.

Display encoder 7 is a National DM74447 binary coded decimal to seven segment encoder. Numerical display 8 is a light emitting diode, or liquid crystal, seven sgement numerical display. Keyboard encoder 9 is a National MM74C922N keyboard encoder which includes a debounce switch, which has been shown separately as debounce switch 25, and also an oscillator scanner which is used to scan keyboard 24.

Buffer 10 is a National DM71LS98 tri-state octal buffer inverter, only half of which is utilized. Ratio counter 14 is a National DM74LS92 zero to 11 counter with a 2:1 ratio output. Timers 13,15,16 and 17 are all National 555 timers. Inverters 18 and 26 are entirely conventional as is the exclusive nor gate G.

Isolators 19 and 20 are connected to the outputs of timers 16 and 17 so as to prevent the output of one of these timers influencing the other timer. In the simplest case isolators 19 and 20 comprise a diode of the correct polarity.

With no card inserted in the slot 31, the light emitted from light sources L1 and L2 is received by phototransistors PT1 and PT2 respectively so that the inputs of the gate G have the same logical value. Similarly when the card is fully inserted in slot 31, the light from both light sources L1 and L2 is prevented from reaching the phototransistors PT1 and PT2 respectively so that again the inputs to the gate G have the same logical value. Under these circumstances the output of gate G is high thereby causing the output of inverter 26 to be low turning transistor T1 off and preventing the light sources L3 to L13 from operating.

However as the card commences its entry into the slot 31 the light from light source L1 will immediately be blocked and therefore the output of phototransistor PT1 will be different from that of phototransistor PT2. As a result the output of gate G will go low thereby causing the output of inverter 26 to to high, turning transistor T1 on and allowing light sources L3 to L13 inclusive to operate. In addition, the change of state of the output of inverter 26 is registered by debounce switch 25 which therefore signals demultiplexer 2 in order to have it accept the information conveyed to it by the outputs of phototransistors PT3 to PT12 inclusive.

Therefore as the card is inserted into the slot 31, for each row of the card the corresponding registration hole 40 permits light to pass from light source 13 to phototransistor PT13. As a result the changed output of phototransistor PT13 is received by binary counter 4. Simultaneously the phototransistor corresponding to the digit hole 41 of the particular row receives light through the digit hole 41 from the corresponding light source.

Because demount switch 25 has been activated, demultiplexer 2 accepts the outputs of phototransistors PT3 to PT12 and, in cooperation with priority encoder 1, passes the digit encoded in the row of the card to the memory 3 in the form of a binary coded decimal digit. The binary counter 4 provides the necessary information to the memory 3 in order that the memory 3 store the digits encoded on the card in the correct sequence.

As the card is moved further into the slot 31, light from light source L13 is no longer able to pass through the registration hole 40 to be received by phototransistor PT13. Accordingly its output changes state until the next registration hole 40 is in the correct position. In this way the binary counter 4 is advised each time a row of the card is "read" by means of the light sources L3 to L12 and phototransistors PT3 to PT12, the information being passed to the demultiplexer 2 and thence to the memory 3. The card is preferably encoded in such a manner that the last digit appearing on the card is zero, this digit being stored in the memory 3 and being used throughout the circuit to indicate the end of a dialling sequence. That is, there is one more registration hole 40 than there are digits in the desired telephone number.

When the card is fully inserted in the slot 31 the light emitted by light source L2 is no longer able to be received by the phototransistor PT2. As a result the output of phototransistor PT2 changes so that both phototransistors PT1 and PT2 have the same output. Thus the output of gate G goes high sending the output of inverter 26 low thereby turning transistor T1 off and preventing light sources L3 to L13 from being operated. At the same time debounce switch 25 is deactivated so as to prevent the passage of data from the phototransistors PT3 to PT12 to the memory 3. In this way when the card is moved within the slot 31 or withdrawn from the slot 31, the movement of the holes 40 and 41 past the light sources and phototransistors cannot cause any spurious information to be entered into the memory 3.

The number to be dialled may also be entered into the device by means of the keyboard 24. This is done by simply depressing each of the numbers of the telephone number to be dialled, in turn, on the keyboard 24. The output of the keyboard 24 is passed via keyboard encoder 9 and buffer 10 to be stored in memory 11. In this way two numbers to be dialled by the automatic dialling device may be separately stored at the one time.

The sequence of operations followed in order to automatically dial the telephone number stored in memory 3, which has been obtained from the encoded card, will now be described. It will be noted that resistor R2 connected between the positive supply voltage V and the multiplexer 5 ensures that the multiplexer 5 will pass the data it receives from memory 3 to the up/down counter 6 unless the output of inverter 8 goes low, in which case the data contained in memory 11 will be passed by multiplexer 5 to the up/down counter 6 instead. When card switch 21 is depressed, timer 16 is activated thereby sending a signal via isolator 19 to timer 13. Timer 13 sends a signal to both binary counters 4 and 12 which thereby activate both memories 3 and 11 respectively to transmit the binary coded data corresponding to the first digit of the stored telephone numbers to multiplexer 5. Multiplexer 5 accepts only that data transmitted to it by memory 3 and forwards the data to up/down counter 6. The up/down counter 6 simultaneously forwards the data to display encoder 7 which illuminates numerical display 8 so as to visibly indicate the first digit of the number to be dialled. At the same time, up/down counter 6 causes timer 13 to activate timer 15 which in turn activates the ratio counter 14. The ratio counter 14 produces an output at X which is a square wave having the 2:1 mark-space ratio required for dialling pulses by the telephone authority. A pulse is passed around the loop comprising up/down counter 6, timers 13 and 15 and ratio counter 14 as up/down counter 6 counts through the numerical value of the digit to be dialled. Accordingly a number of pulses appears at the output X of the ratio counter 14 according to the numerical value of the digit.

When up/down counter has completed its count, up/down counter 6 again signals timer 13 causing binary counters 4 and 12 to increment by 1 thereby passing the next digit of the telephone number stored in memory 3 via multiplexer 5 to the up/down counter 6.

As a result the next digit of the telephone number is displayed on the numerical display 8 and also the required series of pulses are produced by the ratio counter 14. This procedure continues for each digit in the series of digits making up the telephone number to be dialled until the final zero stored in memory 3 is received.

When this zero is received the up/down counter 6 signals timers 16 and 17 thereby causing timer 16 to deactivate timer 13 via isolator 19. Timer 13 therefore returns binary counters 4 and 12 to their initial count value, in consequence returning the circuit to its state or condition prior to the operation of the card switch 21. As a result, if the number dialled by the dialling unit is engaged, or for some other reason does not answer, the same number may be dialled at a later time by simply operating the card switch 21 again.

In order to dial the number stored in memory 11 by operation of the keyboard 24, the keyboard switch 23 is operated thereby causing timer 17 to change the output of inverter 18 to low. As a result the multiplexer 5 is commanded to transmit data sent to it by memory 11, and not memory 3 as previously. In addition, the timer 17 also activates, via isolator 20, the timer 13 so as to set in train the abovedescribed procedure for dialling and display of the required number. Since the timer 13 increments both binary counters 4 and 12 during the abovedescribed sequence, the digits stored in memory 11 which comprise the desired telephone number to be dialled, are fed to the presettable up/down counter 6 via the multiplexer 5. During either of the above dialling operations if the cancel switch 22 is operated, both timers 16 and 17 are deactivated thereby causing timer 13 to be deactivated and resulting in binary counters 4 and 12 being reset to their initial values.

It will be apparent from the foregoing that the telephone number encoded on a card may be stored in the automatic dialling device and dialled as often as necessary to make the required telephone connection. In addition, the keyboard 24 may be used to dial a number which has been entered into the memory 11 via the keyboard 24. Again this keyboard entered telephone number may be dialled as many times as necessary in order to make the desired telephone connection. Furthermore because two memories 3 and 11 are used, two different telephone numbers may be stored and either one dialled in any sequence as often as necessary until the desired telephone connection has been achieved.

If the type of card illustrated in FIG. 4 is utilized, the primary encoder 1 and demultiplexer 2 of FIG. 2 may be omitted (as indicated by the dashed lines) because the data provided directly by the phototransistors will be encoded as binary coded decimal. In the card of FIG. 4, a conventional encoding format, as used in a teletyper for example, is followed. In this case the registration holes 40 comprise the holes normally used to feed paper tape, such holes normally receiving the sharp teeth of a toothed drive wheel. Again each registration hole 40 defines a row which may contain up to four digit holes 41, three located to the right of the column of registration holes 40 (as seen in FIG. 4) and one to the left. In this way binary coded decimal numbers may be encoded directly onto the card.

Such an encoding naturally saves a number of the light sources and phototransistors since only five light sources and five phototransistors will be required instead of the ten illustrated in FIG. 2. In addition, the light source and phototransistor adapted to cooperate with registration holes 40, will be required to be located in a different position relative to the remainder of the light sources and phototransistors because the location of the column of registration holes 40 is different in FIG. 4 from the arrangement of FIG. 3. This will be clear to those skilled in the art.

FIG. 5 is a schematic block diagram of a very primitive card reader in accordance with the present invention. In this embodiment, a binary coded decimal card such as that illustrated in FIG. 4 is used and therefore the priority coder 1 and demultiplexer 2 (of FIG. 2) are not required. In addition, no keyboard 24 is provided so that the device will only dial telephone numbers which are encoded on cards. Furthermore, no numerical display 8 indicating the actual digit of the number presently being dialled is provided.

As a result, in the circuit of FIG. 5 only memory 3, binary counter 4, up/down counter 6, timers 13 and 15, ratio counter 14 and debounce switch 25 are provided. When debounce switch 25 is operated, as described above in connection with FIG. 2, the data provided by the photo diodes is read directly into memory 3. Binary counter 4 immediately passes the first digit so received directly to up/down counter 6 which activates the loop containing timers 13 and 15 and ratio counter 14 in order to cause the number of pulses corresponding to the numerical value of the first digit to be dialled to appear at the output X of the ratio counter 14. When that sequence of pulses is completed the timer 13 increments the binary counter 14 thereby causing the second digit to be dialled, and so on.

It will be clear that the present invention has many applications, one such application using the embodiment of FIG. 2 is illustrated in FIG. 6. The circuit of FIG. 6 illustrates in schematic form a telephone call re-directing arrangement which finds particular application in the office of a businessman. The office has two independent telephone lines, a first line 50 having a first telephone 51, and a second telephone line 52 having a second telephone 53 to which the dialling unit 54 of FIG. 2 is connected. The first and second telephone lines 50 and 52 respectively are able to be inter-connected by means of a normally open switch 55 operable by a sensor 56. An inductive pick-up 57 is disposed adjacent the first telephone line 50 and is connected to the sensor 56. The sensor 56 is also connected to the dialling unit 54.

Should the businessman wish to leave his office and re-direct incoming calls to another telephone, located at his home for example, the businessman enters his home telephone number via either the keyboard 24 or one of his own encoded business cards into the corresponding one of the memories of the dialling unit. When an incoming call is received on the first telephone line 50, the dialling pulses sent along the line 50 are recorded by the inductive pick-up 7 and used to trigger the sensor 56 which, in its simplest form, comprises a Schmidt Trigger and a relay. The output of the inductive pick-up 57 changes the output of the Schmidt Trigger thereby causing the relay to close switch 55 and operate either card switch 21 or keyboard switch 23 depending upon the method used by the businessman to store his home telephone number in the dialling unit 54.

Once the dialling unit 54 is activated, the dialling unit, via second telephone 53, dials the home telephone number of the businessman and reaches him via the second telephone line 52. The businessman therefore answers the phone at his home and receives, via closed switch 55, the incoming telephone call originally received on the first telephone line 50. Therefore by making a single telephone call the client may reach the businessman when he is out of his office. In addition, the client will not be aware that the businessman is away from his office unless the businessman informs him.

The above arrangement provides a substantial improvement over existing telephone answering equipment having a recorded message and a facility to record incoming messages since, not only does the client receive immediate personal attention, but potential thieves are unable to ascertain that a particular office is unattended at any time simply by telephone the office.

In another application of the present invention, the embodiment of FIG. 2 may be used as part of an automatic alarm system. In such a system, the keyboard switch 23 is arranged to be operable by means of a fire detector, smoke detector, burglar activated switch, or the like. At the end of the day's work, a businessman enters his home telephone number or the telephone number of his local police station, into the dialling unit via the keyboard 24. Then in the event of fire or entry by a burglar, the keyboard switch 23 is operated and the number of the police station or the businessman's home is automatically dialled.

Many devices are known which may be used to make the keyboard switch 23 operate repeatedly at spaced intervals. In this way the businessman's home telephone will be rung repeatedly thereby advising the businessman of the detection of the fault, fire or entry. Alternatively, known recording devices may be used to transmit via the telephone a pre-recorded message to a local police station, for example, in order to advise of the location of the fault or unauthorised entry. In this way action may be taken to apprehend burglars or extinguish fires without any alarm being given at the location of the dialling unit.

The foregoing describes only some embodiments of the present invention and modifications, obvious to those skilled in the art, may be made thereto without departing from the scope of the present invention.

What we claim is:

1. An automatic telephone dialing apparatus comprising card reading means to serially read each digit of an encoded telephone number from an elongated business card, credit card, or similar flat object, said card having a width between a minimum and a maximum predetermined dimension, a variable length of at least a predetermined minimum dimension, and a minimum stiffness insufficient to prevent transverse buckling of said card under longitudinal stress, a card entered memory connected to said card reading means to sequentially receive therefrom at a ramdon rate, and store, each said digit, and a dial pulse generating circuit connected to said memory to generate at a predetermined rate a telephone dialing pulse train in accordance with the numerical value of each of the digits stored in said memory, wherein each said digit is encoded on said card as one or more holes therein, each located at a corresponding spaced location along a line transverse to the longitudinal axis of said card, the location of said holes representing the numerical value of each said digit and being at predetermined distances from one edge of said card, said minimum predetermined card width being directly determined by the maximum number of holes used to encode any digit and the spacing of said holes, the spacing between said lines being random along the length of the card starting from a first end of the card with no line being more than the minimum predetermined card length dimension from said first end;

said card reading means comprising a plurality of spaced light sources, and a corresponding plurality of light sensitive devices in a slot, each of said light sensitive devices being arranged to receive light from the corresponding light source, said card being manually insertable, said first end first, in said slot at any random or variable speed between said light sources and said light sensitive devices, the spacing of said light sources and said light sensitive devices permitting light to be received by said devices only via said holes in said card, and wherein said maximum predetermined card width is determined by the width of said slot and said minimum predetermined card length is determined by the depth of said slot.

2. Apparatus as claimed in claim 1 wherein said dial pulse generating circuit is repeatedly operable on demand to generate said telephone dialling pulse train.

3. Apparatus as claimed in claim 1 including a first light source and corresponding first additional light sensitive device adapted to receive light therefrom, a second additional light source and corresponding second additional light sensitive device adapted to receive light therefrom, said first end of said card being manually interposed between said first source and device at commencement of manual insertion of said card and being manually interposed between said second source and device only at completion of said manual insertion of said card, the outputs of said first and second devices being connected via a logic circuit to said card entered memory, said logic circuit permitting entry of said encoded telephone number into said card entered memory only during said manual insertion of said card.

4. Apparatus as claimed in claim 1 including a keyboard, a keyboard entered memory connected to said keyboard to receive and store the digits of a telephone number manually typed on said keyboard, and a multiplexer connected between said pulse generating circuit and both said card entered memory and said keyboard entered memory, said multiplexer permitting said pulse generating circuit to selectively generate a dialling pulse corresponding to the digits stored in either memory.

5. Apparatus as claimed in claim 4 wherein said pulse generating circuit repeatedly, on demand, selectively generates dialing pulses corresponding to the digits stored in either memory.

6. Apparatus as claimed in claim 1 including a numerical display connected to said pulse generating circuit and displaying sequentially digits corresponding to the pulses generated by said pulse generating circuit.

7. A telephone call re-directing apparatus including the automatic telephone dialling apparatus as claimed in claim 1, said re-directing apparatus comprising a first telephone line having a first telephone connected thereto, a second telephone line having a second telephone connected thereto, said automatic telephone dialling apparatus being connected to said second telephone and having the telephone number to which calls are to be re-directed stored therein, a sensor connected to said automatic dialling apparatus to initiate dialling of said stored number and being triggerable by an inductive pick-up connected to said sensor and disposed adjacent said first telephone line, and a normally open switch operable by said sensor and connecting said first and second telephone lines wherein dialling pulses applied to said first line are detected by said inductive pick-up to trigger said sensor thereby causing said stored number to be dialled via said second telephone line and closing said switch to connect said first and second line together.

* * * * *